UNITED STATES PATENT OFFICE.

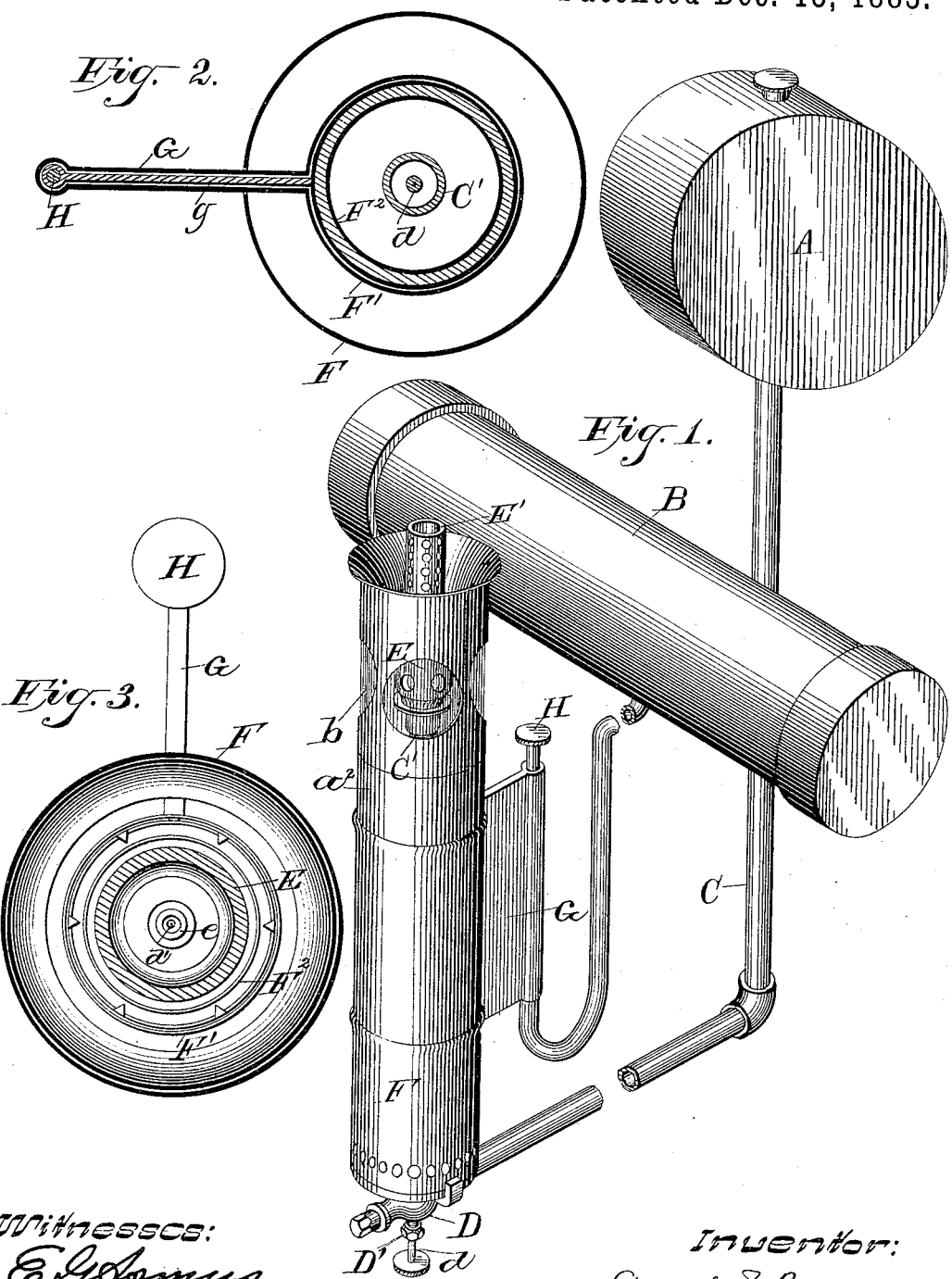

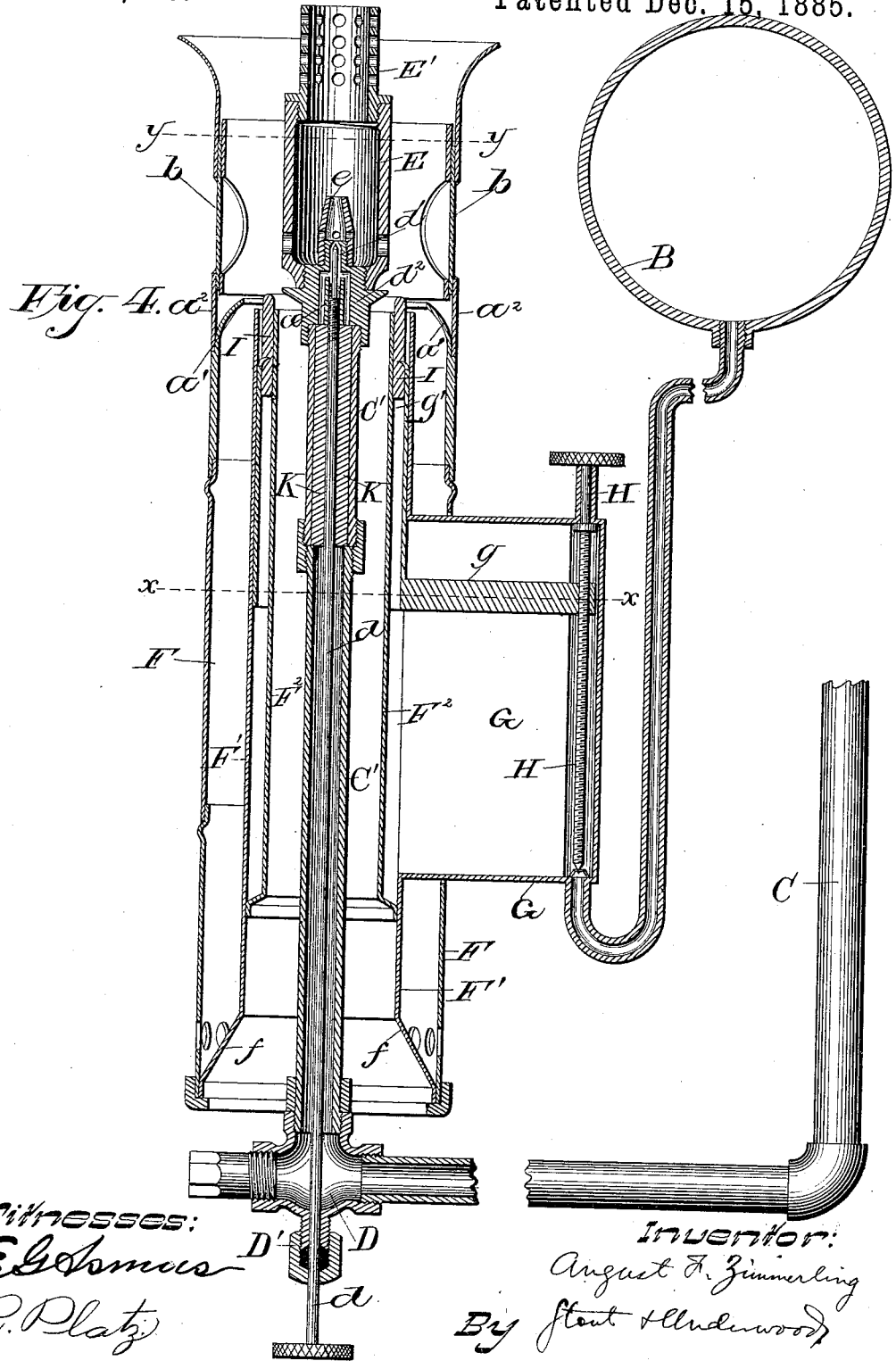

AUGUST F. ZIMMERLING, OF MILWAUKEE, WISCONSIN.

HEATING-LAMP.

SPECIFICATION forming part of Letters Patent No. 332,370, dated December 15, 1885.

Application filed December 23, 1884. Serial No. 151,065. (No model.)

*To all whom it may concern:*

Be it known that I, AUGUST F. ZIMMERLING, of Milwaukee, in the county of Milwaukee, and in the State of Wisconsin, have invented certain new and useful Improvements in Heating-Lamps; and I do hereby declare that the following is a full, clear, and exact description thereof.

My invention relates to the burning of vapor, mainly for heating purposes, and will be fully described hereinafter.

In the drawings, Figure 1 is a perspective view of my invention. Fig. 2 is a section on line $x\ x$ of Fig. 4. Fig. 3 is a section on line $y\ y$ of Fig. 4, and Fig. 4 is a vertical section of my device on an enlarged scale.

I use two reservoirs with my device, the reservoir A preferably to contain a more volatile burning-fluid than reservoir B. C is a pipe that leads from reservoir A, to be joined to an upright tube, C', by a coupling, D, and this coupling D has a stuffing-box, D', through which the valve-shaft $d$ passes on its way to a screw-threaded bushing, $a$, fixed to the upper end of the tube C', which is preferably in sections. On its upper end the shaft $d$ is provided with a needle-valve, $d'$, while a housing, $d^2$, that carries the valve-seat, is screwed onto the upper end of the tube C', that part carrying the seat being reduced to receive the tip $e$, which is perforated to admit air to the gas as it passes out of the valve-orifice. The housing $d^2$ has screw-threads about its upper end to take the screw-threaded shield E, that is also perforated near its lower end, and which preferably has female screw-threads at its upper end, to which is attached the burner E'. The tube C' extends up through a burner for heavier fluids. This burner consists of an outer shell, F, which is perforated near its base and joined below the perforations to an inner tube, F', by a ring, $f$. The inner tube, F', is much smaller than tube F, except at its base, where it flares out to join the latter, and tube F' in turn contains a shorter and smaller tube, F², which is also flared at its bottom, so as to make a tight joint with tube F'. The space between tubes F' and F² forms the wick-receptacle for this burner, and the tube F' is recessed on one side, where a chamber, G, is joined to it. In this chamber the shank $g$ of the wick-raiser $g'$ slides, and the latter is controlled by a screw-bolt, H, that passes down through a screw-threaded nut attached to the outer end of the shank; or this end of the shank may be enlarged and provided with a screw-threaded aperture, so that the wick I can be raised and lowered by turning the milled head of the screw-bolt. The pipe from the chamber B leads into the chamber G, and from it the oil flows to the wick, while the fluid from reservoir A flows through pipes C and C', and from thence through the packing K in the latter into the housing $d^2$. The tube F is preferably made in sections, and the upper section is provided with a deflector, $a'$, and a chimney or air-shield, $a^2$, may be fitted to it, which, in turn, may be provided with windows $b$, for allowing the light to shine through.

The operation of my device is as follows: The heater is first started by lighting the wick I, which as it burns heats the vapor-burner, and in turn converts the fluid that flows into the housing $d^2$ into gas, which latter is let out into the tip by lowering the needle-valve. The tube F forms a chimney on the inside of the burner, and for feeding the inner surface of the wick-flame, and this tube and tube F' form a chimney for the outside of the same, so that there will always be a sufficient draft to feed the flame and make perfect combustion, with the difference, in this respect, from other lamps, that I place my draft-tubes below instead of above the burner.

Having thus fully described my invention, what I claim as new, and desire to secure by Letters Patent, is—

1. The combination, in a heating-lamp, of a vapor-burner free from any wick, and a wick-burner surrounding the latter, and a draft-tube surrounding the wick-burner and below the vapor-burner, substantially as set forth.

2. The combination, in a heating-lamp, of a vapor-burner free from any wick, and a wick-burner surrounding the latter, and an outer draft-tube with a deflector parallel with the top of the wick, and an air-shield above said wick, but below the top of the vapor-burner, substantially as set forth.

3. The combination, in a heating-lamp, of draft and wick tubes F F' F², with the chamber G, reservoir B, and pipe from reservoir to chamber, wick-raiser $g'$, with shank $g$, and screw-bolt H, passing through shank $g$, substantially as set forth.

4. In a heating-lamp, the combination of the tubes F F' F², one within the other, and of diminishing length, upright tube C', coupling D, reservoir A, tube C, valve-shaft $d$, packing K, needle-valve $d'$, bushing $a$, housing $d^2$, and tip $e$, with shield E and burner E', substantially as set forth.

In testimony that I claim the foregoing I have hereunto set my hand, at Milwaukee, in the county of Milwaukee and State of Wisconsin, in the presence of two witnesses.

AUGUST F. ZIMMERLING.

Witnesses:
S. S. STOUT,
H. G. UNDERWOOD.